Figure 1:
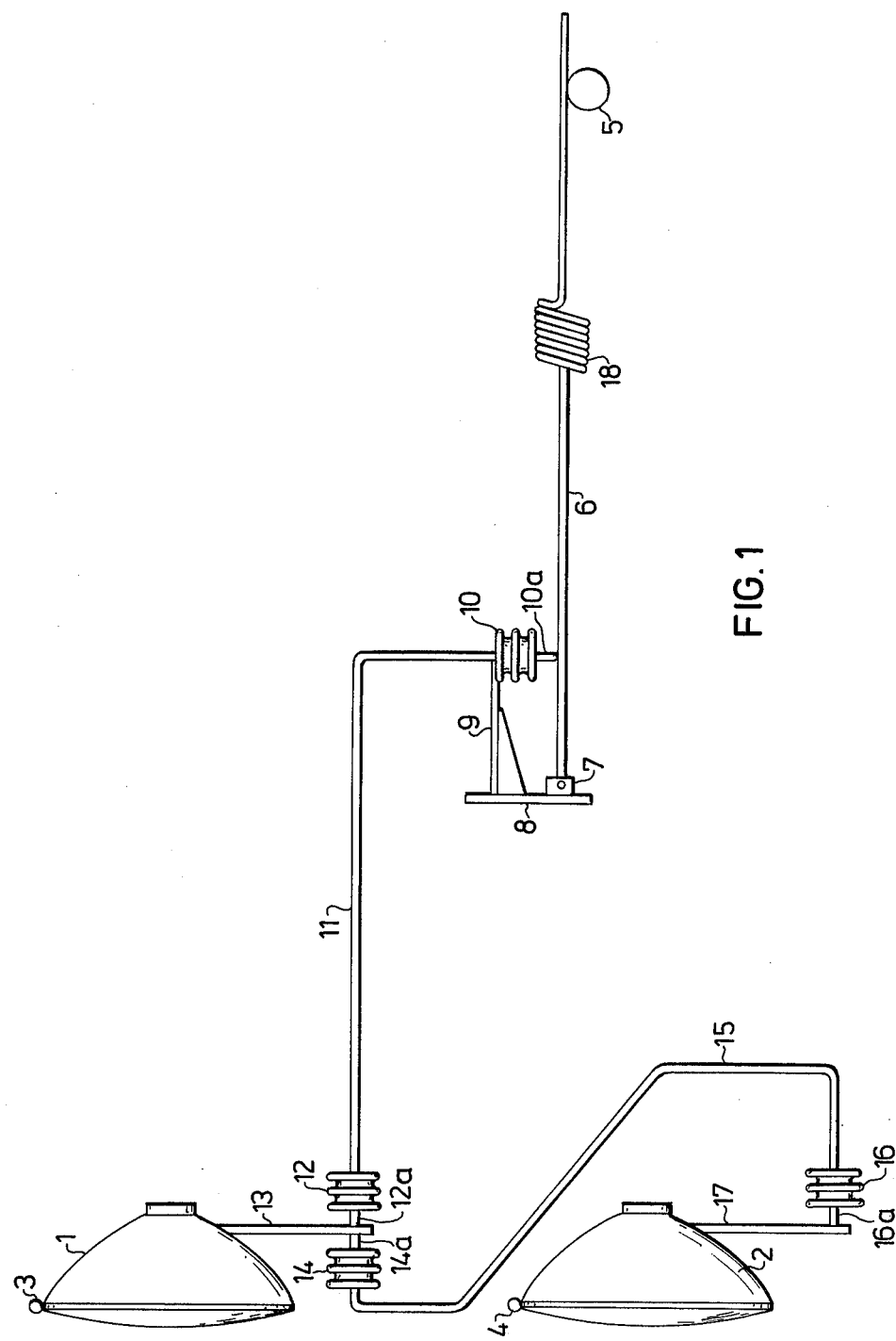

United States Patent [19]

Engström

[11] 4,026,110
[45] May 31, 1977

[54] DEVICE FOR TEMPERATURE COMPENSATION IN A PRESSURE MEDIUM CIRCUIT

[75] Inventor: Bengt Lars Olof Engström, Trollhattan, Sweden

[73] Assignee: Saab-Scania Aktiebolag, Sodertalje, Sweden

[22] Filed: Oct. 14, 1975

[21] Appl. No.: 622,117

[30] Foreign Application Priority Data

Oct. 14, 1974 Sweden .............................. 7412872

[52] U.S. Cl. ........................................ 60/592; 92/37
[51] Int. Cl.² ............................................. F15B 7/10
[58] Field of Search ................................ 92/37, 39; 60/542, 543, 572, 584, 585, 592

[56] References Cited

UNITED STATES PATENTS

| | | | |
|---|---|---|---|
| 1,862,569 | 6/1932 | Gargan | 60/572 X |
| 2,168,397 | 8/1939 | DeGiers | 60/572 |
| 2,468,489 | 4/1949 | D'Arcey | 60/572 |
| 2,536,628 | 1/1951 | Denisoff | 60/592 X |
| 3,217,496 | 11/1965 | Lemoine | 60/592 |
| 3,234,739 | 2/1966 | Pierce | 60/592 |
| 3,626,696 | 12/1971 | Munier et al. | 60/572 X |

*Primary Examiner*—Edgar W. Geoghegan
*Attorney, Agent, or Firm*—Cushman, Darby & Cushman

[57] ABSTRACT

A device for compensating temperature dependent volume variations in a closed pressure medium system where at least two variable volume members are connected via a pipe to each other for transfer of movement between each other. At least one of the movement transmitting members has two ends freely movable relative to the pipe. One of the ends cooperates with a support, the position of which varies with the temperature as the volume of a flexible means, which is rigidly attached to the pipe, changes. The other end of the movement transmitting member is freely movable relative to the flexible means.

7 Claims, 2 Drawing Figures

DEVICE FOR TEMPERATURE COMPENSATION IN A PRESSURE MEDIUM CIRCUIT

The present invention relates to a device for compensating temperature dependent volume variations in a movement transmitting pressure medium circuit. The invention has manifold application and is particularly advantageous in a device for adjusting vehicle headlights in response to vehicle load.

In such devices for headlight adjustment, high demands are placed on correct adjustment of the angular position of the headlights in relation to the roadway. Small errors in this adjustment produce effects which negatively influence essential traffic safety factors such as range of visibility and glare risks. In adjustment devices having a pressure medium-filled transducer system, an undesirable change in headlight adjustment can result from the temperature dependence of the medium volume. Temperature variations in vehicle installations can entail that the medium volume changes to such a degree that special measures are required to keep the effect of volume changes on headlight adjustment within acceptable limits.

In previously known methods for compensating the effect of temperature on hydraulic circuits in level regulating systems for vehicle headlights, various forms of compensating chambers are connected to the hydraulic circuit, which chambers openly communicate with the circuit. However, these known solutions suffer from the disadvantage that they are both expensive and require much space.

The purpose of the present invention is to eliminate the above-mentioned disadvantages and to provide a simple device for compensating temperature dependent volume variations in a pressure medium circuit in a device for adjusting headlights in vehicles as a function of the load on the vehicle. This is accomplished by giving the device the characterizing features to be seen from the following claims.

Figure 2:
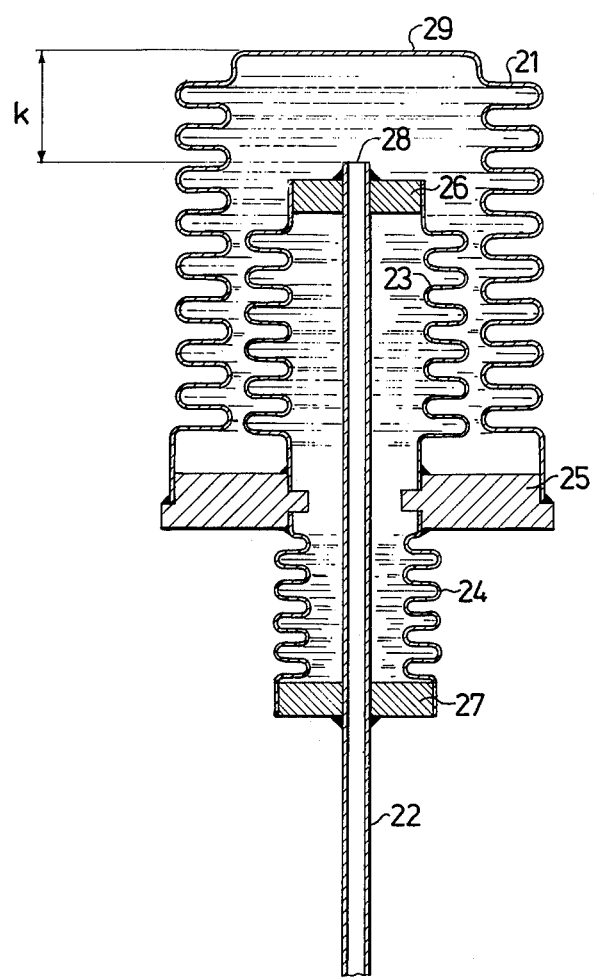

In the following the invention will be exemplified with reference to the attached drawing, where FIG. 1 is a schematic view of the principle construction of a device for adjusting vehicle headlights as a function of the load on the vehicle. FIG. 2 shows how a bellows in a pressure medium filled circuit in the device of FIG. 1 is furnished with a compensating means in accordance with a preferred embodiment of the invention.

The device according to FIG. 1 is intended to regulate the adjustment of two headlights 1 and 2 on the vehicle in response to the load on the vehicle. Alteration of the load causes alterations in the position of the vehicle chassis in relation to the surface travelled upon. This also means that the vehicle chassis alters position in relation to the rear axle 5 of the vehicle, and to means connected thereto. These unavoidable positional alterations are utilized in the device according to the invention to compensate and regulate the adjustment of the headlights for avoiding a dazzling effect on approaching vehicles. To this end the headlights 1,2 are so mounted on the vehicle that they can each be turned about a horizontal shaft 3 and 4 respectively, rigidly mounted on the vehicle. For positional regulation of the headlights 1,2 an arm 6 is arranged between the rear axle 5 and a fixed point on the vehicle body. One end of the arm 6 is pivotably suspended in a support 7 which is attached to the vehicle body, a portion of which is designated by 8 in FIG. 1. When the mutual position between the body 8 and the rear axle 5 is altered, the arm 6, the free end of which is suitably abutting the upper side of the rear axle 5, will turn about the support 7.

As is shown in FIG. 1 a bracket 19 is also attached to the body portion 8. The bracket 9 carries a sensing element in the shape of a flexible bellows 10 which is suitably made of metal, and at one end is attached to the support 9 and at the other end is provided with a pin 10a abutting the arm 6. Pivotal movements of the arm 6 are thus transferred via the pin 10a to actuate the bellows 10 so that its volume is altered.

The bellows 10 is at its attached end connected by a pipe 11 to an actuating means in the shape of a flexible bellows 12 adjacent to the headlights 1,2 of the vehicle. The bellows 10 and 12 and the pipe 11 thereby form a closed system which is filled with an operating medium for transferring the movements of the bellows 10 to the bellows 12. The medium suitably consists of a liquid but even a gas may be used. An alteration of the volume of the bellows 10 is intended to result in a corresponding alteration of the volume of bellows 12. In consideration of this, the bellows 12 is, at the end which is connected to the pipe 11, attached to the vehicle (not shown), and at its free end the bellows 12 engages, by means of a pin 12a mounted on the bellows, a vertical arm 13. The arm is attached to the headlight 1, and the movements of the bellows 12 on alteration in volume are thus transferred via the pin 12a and the arm 13 into pivotal movements of the headlight 1 about the horizontal shaft 3.

The headlight 2 is arranged to be pivoted about the horizontal shaft 4 in response to movements of the arm 13. A second sensing element in the shape of a flexible bellows 14 is at its one end attached to the vehicle (not shown) and the bellows 14 is arranged to sense movements of the arm 13 by means of a pin 14a mounted on the free end of the bellows. The bellows 14 is connected via a pipe 15 with a second actuating element in the shape of a bellows 16. The bellows 14,16 and the pipe 15 thereby form a closed system which is filled with a medium, suitably the same kind of medium as in the closed system 10,11,12. The bellows 16 is at one end attached to the vehicle (not shown) and with a pin 16a mounted at its free end the bellows 16 engages a vertical arm 17 which is attached to the headlight 2. Movements of the bellows 16 on volume alterations are thereby transferred via the pin 16a and the arm 17 into pivotal movements of the headlight 2.

By suitable dimensioning of the ingoing components, the headlights 1,2 can be pivoted to such an extent that their headlamp adjustments are compensated for the positional alterations of the vehicle chassis in relation to the surface travelled upon and the rear axle 5 arising due to load changes.

In order to prevent the bellows 10 or the pipe 11 from being ruptured at severe movements of the rear axle 5, for example when driving on an uneven surface, the arm 6 is suitably made to yield elastically at such movements. For this purpose a portion of the arm 6 exemplified in FIG. 1 is made as a tightly wound helical spring 18 which remains stiff during normal movements but which bends at sudden movements and thereby protects the bellows 10 against too great loads.

In FIG. 2 is shown a longitudinal section of a compensating device for a bellows 21, designed in accordance with the idea of the invention, which device can replace one or more of the bellows 10,12,14,16 in the adjustment device of FIG. 1. The compensating device is adapted to equalize temperature variations in a closed medium circuit and is, to that end, connected to a pipe 22 which in the adjustment device of FIG. 1 can replace each of the pipes 11,15. The actual compensating means in the device according to FIG. 2 comprises two concentric bellows 23 and 24, the opposing ends of which are open and are sealingly connected via a support ring 25 with one another. The bellows 23,24 thereby form a closed volume which is filled with such pressure medium as is used in said closed system. The pipe 22 extends through the bellows 23,24, to which pipe the opposite facing ends of the bellows 23,24 are each rigidly connected via their end plates 26,27. In the support ring 25 between the bellows 23,24 there is provided a clearance hole for the pipe 22, and because of unequally large diameters of the bellows 23,24 the support ring 25 can move in the longitudinal direction of the pipe 22 when the dimension of the closed volume changes with the temperature. When the support ring 25 moves, the bellows 21 also moves, said bellows being sealingly attached at its one end to the support ring 25. This entails that the bellows 23 in the compensating device is contained in the bellows 21. The volume enclosed in the bellows 21 communicates with the pipe 22 via the pipe opening 28 which is located inside the bellows 21 on the same side of the end plate 25 as the bellows 21.

The distance between the opening 28 and the end plane 29 of the bellows 21 is designated by $k$ in FIG. 2. The object of the compensating device is to maintain the distance $k$ independent of changes in temperature. How this is accomplished is explained in the following description.

A volume expansion of the medium in the bellows 21 as a result of a rise in temperature produces an extension of the bellows 21. This would involve an increase of the distance $k$ if no compensation were carried out. However, the temperature increase also produces a volume expansion of the medium contained in the bellows 23 and 24. Since the bellows 23 has a greater diameter than the bellows 24, the volume expansion will entail an extension of the bellows 23 and a corresponding decrease of the length of the bellows 24. The support ring 25 is thereby moved in a direction away from the opening 28 of the pipe 22. In the movement of the support ring 25 the entire bellows 21 follows, whereby the end plane 29 of the bellows 21 approaches the opening 28 of the pipe 22. A compensation of the temperature dependent volume expansion in the bellows 21 is thereby obtained. By properly balancing the dimensions of the bellows 21 and of the bellows 23,24 in the compensating device, full compensation can be achieved or optionally carried out to another satisfactory level. The relation to be satisfied in order for the compensation of the volume expansion of the bellows 21 to be complete can be expressed theoretically in the following way:

$$\frac{t_k \Delta t [V_{21} - V_{23}]}{A_{21} - A_{23}} = \frac{[V_{23} + V_{24}] t_k \Delta t}{A_{23} - A_{24}}$$

where $V_{21}$, $V_{23}$ and $V_{24}$ are the volumes of the respective bellows, $A_{21}$, $A_{23}$ and $A_{24}$ are the areas of the respective bellows, $\Delta t$ is the temperature change, and $t_k$ is the volume expansion coefficient of the medium.

As is clear from the above expression, no consideration has been given to the volume enclosed in the pipe 22. Because the dimensions of the pipe are relatively small, this volume is quite small in relation to the volume of the bellows, for which reason any effect of the pipe volume on the headlight adjustment can be ignored for present purposes. It is, however, possible in said expression to let $V_{21}$ stand for the sum of the volumes of the bellows 21 and of the pipe 22, so that in dimensioning the compensating device certain consideration can be given to the change with temperature of the volume enclosed in the pipe 22.

Within the scope of the idea of invention and the following claims, a plurality of modifications of the exemplified embodiment are possible. The bellows 24 in the compensating device can thus be replaced with a coil spring and the remaining compensating bellows 23 be furnished with a seal against the pipe 22. Said seal thereby has a flexible connection with the bellows 23 so that the bellows can be extended in the direction of the pipe 22. It is further possible to separate the compensating device from the bellows 21 so that the compensating device influences the support ring for the adjustment device bellows outside of the bellows. Within the scope of the idea of invention is also included the possibility of having different media in the compensating and adjusting devices. This also embraces the possibility of executing the compensating device as a member of a solid material, e.g. a spring, the length of which varies sharply with temperature.

In addition, the compensating device according to the invention can be used equally well in pressure medium circuits which instead of bellows contain actuating members of the cylinder-piston type or a cylinder with a membrane bearing on a piston. The cylinder end, which the piston rod does not pass through, is then sealingly attached to the movable support ring.

The device according to the present embodiment is usable not only for temperature compensation. The movement of the support ring is directly proportional to a temperature change and in consideration thereof, the device can also be used for indicating the temperature directly on a scale or serve as a carrier of temperature information in devices which are controlled by the temperature. Moreover, it is possible when using the device as a machine member to let the two compensation forming bellows act as a linear motor or pump. In such applications it is significant that a long movement of the support ring implies a small change in volume of the volume enclosed by the bellows. This is achieved by making the area difference between the bellows relatively small.

What I claim is:

1. A device for compensating temperature dependent volume variations in a movement transmitting pressure medium circuit, which circuit comprises at least two variable volume, movement-transmitting members and a pipe which connects the members to form a closed pressure medium system which transmits a volume change in one member to at least one other member in the pressure medium system and thereby permits movement transfer between means which are situated outside the system, characterized in that at least one of the movement transmitting members has two ends which are freely movable relative to the pipe in the lengthwise direction of the pipe, one of said ends bearing against a support plane, the position of which in the lengthwise direction of the pipe is variable as a function of a temperature-induced volume variation of a flexible means affixed to said plane, said flexible means bearing with at least one end against a means rigidly attached in relation to the pipe, while the other end of the member is freely movable relative to the flexible means, whereby temperature dependent variations in the member are compensated by displacements of the support plane under the influence of volume variations in the flexible means.

2. A device according to claim 1, characterized in that the flexible means comprises a closed volume filled with a temperature dependent pressure medium.

3. A device according to claim 1 wherein the members are shaped like bellows.

4. A device for compensating temperature dependent volume variations in a movement transmitting pressure medium circuit, which circuit comprises at least two variable-volume, movement-transmitting members and a pipe which connects the members to form a closed pressure medium system which transmits a volume change in one member to at least one other member in the pressure medium system and thereby permits movement transfer between means which are situated outside the system, characterized in that at least one of the movement transmitting members has two ends which are freely movable relative to the pipe in the lengthwise direction of the pipe, one of said ends bearing against a support plane, the position of which in the lengthwise direction of the pipe is variable as a function of a temperature-induced volume variation of a flexible means which comprises two opposing bellows filled with a temperature dependent pressure medium having unequally large cross sectional areas, the ends of the bellows facing away from one another being attached by means rigidly attached to the exterior of the pipe, the ends of the bellows facing one another being open and being affixed to the member support plane around a hole in the support plane, which hole connects the interiors of the bellows, the bellows having the greater cross sectional area being located on the same side of the support plane as the member, the other end of said one movement-transmitting member being freely movable relative to the flexible means, whereby temperature dependent variations in said one movement-transmitting member are compensated by displacements of the support plane under the influence of volume variations in the flexible means.

5. A device as in claim 4 wherein said bellows and said one member have substantially cylindrical shape, the bellows having a smaller diameter and length than said member and being concentric with said member.

6. A device as in claim 4 wherein said movement-transmitting members are bellows.

7. A device for compensating temperature dependent volume variations in a movement-transmitting pressure medium circuit, which circuit comprises at least two variable volume, movement-transmitting bellows and a pipe which connects the bellows to form a closed pressure medium system which transmits a volume change in one bellows to at least one other bellows in the pressure medium system and thereby permits movement transfer between means which are situated outside the system, characterized in that at least one of the movement transmitting bellows has two ends which are freely movable relative to the pipe in the lengthwise direction of the pipe, one of said ends bearing against a support plane, the position of which in the lengthwise direction of the pipe is variable as a function of a temperature-induced volume variation of a flexible means which comprises two opposing bellows having unequally large cross sectional areas, the ends of the opposing bellows facing away from one another being attached by means rigidly attached to the exterior of the pipe, the ends of the opposing bellows facing one another being open and being affixed to said support plane around a hole in said support plane, which hole connects the interiors of the opposing bellows, the bellows having the greater cross sectional area being located on the same side of said support plane as the member, the other end of said one movement-transmitting bellows being freely movable relative to the flexible means, said opposing bellows and said one movement-transmitting bellows having substantially cylindrical shape, said opposing bellows having a smaller diameter and length than said one movement-transmitting bellows, and said opposing bellows being concentric with said one movement-transmitting bellows, whereby temperature dependent variations in said one movement-transmitting bellows are compensated by displacements of the support plane under the influence of volume variations in the flexible means.

* * * * *